United States Patent
Schmidt et al.

(10) Patent No.: US 6,535,894 B1
(45) Date of Patent: Mar. 18, 2003

(54) APPARATUS AND METHOD FOR INCREMENTAL UPDATING OF ARCHIVE FILES

(75) Inventors: Rene W. Schmidt, Palo Alto, CA (US); Hans E. Muller, Saratoga, CA (US); Scott R. Violet, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 316 days.

(21) Appl. No.: 09/585,662

(22) Filed: Jun. 1, 2000

(51) Int. Cl.[7] ................................................ G06F 17/30
(52) U.S. Cl. ..................................................... 707/204
(58) Field of Search ...................... 707/10, 203, 200-1, 707/204, 202

(56) References Cited

U.S. PATENT DOCUMENTS 5,835,911 A * 11/1998 Nakagawa et al. ............ 707/10
6,052,531 A * 4/2000 Waldin et al. ................. 707/10

* cited by examiner

Primary Examiner—Diane D. Mizrahi
(74) Attorney, Agent, or Firm—Thelen Reid Priest LLP

(57) ABSTRACT

According to aspects of the present invention, an original archive file having one or more entries is created, where each entry in the original archive file is itself a file, and where each entry in the archive file may comprise any file type, including an archive file. The original archive file is transmitted to a client computer. Subsequently, a target archive file is created, wherein one or more of the entries in the target archive file are typically expected to be identical to one or more entries in the original archive file. Given the original archive file and the target archive file, a difference archive file is created. The difference archive file comprises an index file describing the changes between the original archive file and the target archive file, and also comprises a set of entries corresponding to the entries in the target archive file that are not contained in the original archive file. The difference archive file is transmitted to the client computer, instead of requiring that the entire target archive file be transmitted. At the client computer, the difference archive file is applied to the original archive file to produce a synthesized archive file, wherein the synthesized archive file is functionally identical to the target archive file, and wherein each entry in the synthesized archive file is identical to a corresponding entry in the target archive file.

17 Claims, 12 Drawing Sheets

APPARATUS AND METHOD FOR INCREMENTAL UPDATING OF ARCHIVE FILES

BACKGROUND OF THE INVENTION

1. Field of the Invention

The present invention relates to data communication networks and to software applications suitable for use in such networks. More particularly, the present invention relates to an apparatus and method to facilitate incremental updating of program code.

2. The Background Art

As is known to those of ordinary skill in the art, the Java™ language is an object-oriented language developed by Sun Microsystems, Inc. that can be integrated into conventional Hypertext Markup Language ("HTML") browsers, and which allows a document server to provide the browser with documents as well as with executable code. The executable code can be automatically loaded from the document server if the HTML browser determines that it does not have the appropriate code already resident on the user machine.

Typically, the executable code takes the form of application programs known as "applets" comprising "bytecodes" that are machine independent. These applets are then interpreted by operating system specific applet interpreters (virtual machines). For example, a current Internet/Web browser implementation using the Java™ language is the HotJava™ browser, also developed by Sun Microsystems, Inc.

The platform-independent nature of Java™ class files allow developers to write a single version of their applet or application, and then to deploy the applet or application on a wide variety of different hardware and operating systems. Moreover, the Java™ platform implements a very advanced security model. According to this security model, a user can run untrusted Java™ applets and applications and be certain that the integrity of his or her system and personal data is never compromised. For example, as is well known, a Java™ applet or application may be run in a "sandbox" that prevents it from causing any harm or from gaining access to private information stored on a user's system or local network.

As mentioned above, a common way of deploying Java™ applications across a network is by using Java™ applets. Applets are typically downloaded and executed by a Java™-enabled web-browser, and make it possible to deploy Java™ software over the web with no installation needed by the user.

A Java™ program (either an applet or an application) is composed of a number of classes and interfaces. Unlike many programming languages, in which a program is compiled into machine-dependent, executable program code, Java™ classes are compiled into machine independent bytecode class files. Each class contains code and data in a platform-independent format called the class file format. The computer system acting as the execution vehicle contains a program called a virtual machine, which is responsible for executing the code in Java™ classes. The virtual machine provides a level of abstraction between the machine independence of the bytecode classes and the machine-dependent instruction set of the underlying computer hardware. A "class loader" within the virtual machine is responsible for loading the bytecode class files as needed, and either an interpreter executes the bytecodes directly, or a "just-in-time" ("JIT") compiler transforms the bytecodes into machine code, so that they can be executed by the processor. FIG. 1 is a block diagram illustrating a sample Java™ network environment comprising a client platform 102 coupled over a network 101 to a server 100 for the purpose of accessing Java™ class files for execution of a Java™ application or applet.

In FIG. 1, server 100 comprises Java™ development environment 104 for use in creating the Java™ class files for a given application. The Java™ development environment 104 provides a mechanism, such as an editor and an applet viewer, for generating class files and previewing applets. A set of Java™ core classes 103 comprise a library of Java™ classes that can be referenced by source files containing other Java™ classes. From Java™ development environment 104, one or more Java™ source files 105 are generated. Java™ source files 105 contain the programmer-readable class definitions, including data structures, method implementations and references to other classes. Java™ source files 105 are provided to Java™ compiler 106, which compiles Java™ source files 105 into compiled "class" files 107 that contain bytecodes executable by a Java™ virtual machine. Bytecode class files 107 are stored (e.g., in temporary or permanent storage) on server 100, and are available for download over network 101.

Client platform 102 contains a Java™ virtual machine ("JVM") 111 which, through the use of available native operating system (O/S) calls 112, is able to execute bytecode class files and execute native O/S calls when necessary during execution.

Java™ class files are often identified in applet tags within an HTML (hypertext markup language) document. A web server application 108 is executed on server 100 to respond to HTTP (hypertext transport protocol) requests originating from a web client (also called a "web browser") 113 on client 102 containing URLs (universal resource locators) to HTML documents, commonly referred to as "web pages." When a browser application 113 executing on client platform 102 requests an HTML document, such as by forwarding URL 109 to web server 108, the browser automatically initiates the download of the class files 107 identified in the applet tag of the HTML document. Class files 107 can be downloaded from the server and loaded into virtual machine 111 individually as needed.

A Java™ archive ("JAR") format (also known as a "jar" format) has been developed to group class files together into a single transportable package known as a JAR file. As is known to those of ordinary skill in the art, JAR files encapsulate Java™ classes using an archived, compressed format. A JAR file can be identified in an HTML document within an applet tag. When a browser application reads the HTML document and encounters the applet tag, the JAR file is downloaded to the client computer and decompressed. Thus, a group of class files (typically, several dozens of them) may be downloaded from a server to a client in a single download transaction. After downloading and decompressing, the archived class files are available on the client system for individual loading as needed in accordance with standard class loading procedures. The archived class files remain subject to storage inefficiencies due to duplicated data between files, as well as to memory fragmentation due to the performance of separate memory allocations for each class file.

The smallest distribution unit for a Java™-based application is a class file. A class file is a self-contained unit that describes all information about a single class or interface. As mentioned above, a Java™-based application may consist of hundreds of class files and a set of other resources, such as images, resource bundles, property files, and the like. And, as mentioned above, a JAR file is a standard and convenient method of packaging a Java™-based application. Conceptually, a JAR file is a compressed archive that contains a set of class files and other resource files. Also, a JAR file contains a special directory, META-INF, which can be used to store meta-information about an application. For instance, as will be described in more detail later, the META-INF/manifest.mf entry is a text file that can contain an attribute that describes the main class of an application.

Packaging an application up into one or more JAR files has several benefits, especially when downloading code via a data communication network such as the Internet. First, downloading a JAR file using a single HTTP request is vastly more efficient than downloading each individual entry in the JAR file by itself. Second, class look-up is much more efficient if all application resources are JAR files, since unnecessary network access can be prevented. Third, an application developer can ensure predictable performance. For example, if each class file is downloaded on demand, a broken network connection may cause an application to lose the ability to display an error message, since the error class may not have been downloaded. Finally, as is known to those of ordinary skill in the art, a JAR archive file is the smallest unit that supports code signing.

One disadvantage of using JAR files that is known to those of ordinary skill in the art is that updating an application will typically require large downloads, since the entire JAR file must be replaced. A bug fix or other improvement to an application might only require changes in a few classes (which would typically be in the order of kilobytes in size), but due to the currently known packaging of applications into JAR files, the user would be required to download a completely new JAR file (which would typically be in the order of Megabytes in size).

Thus, what is needed is an apparatus and method that provides all the advantages of archive files such as JAR files, but which is capable of supporting incremental code updates, so that only the changes need to be transmitted to a user, instead of requiring that a completely new archive file be transmitted.

SUMMARY OF THE INVENTION

According to aspects of the present mechanism, an original archive file having one or more entries is created, where each entry in the original archive file is itself a file, and where each entry in the archive file may comprise any file type, including an archive file. The original archive file is transmitted to a client computer. Subsequently, a target archive file is created, wherein one or more of the entries in the target archive file are typically expected to be identical to one or more entries in the original archive file. Given the original archive file and the target archive file, a difference archive file is created. The difference archive file comprises an index file describing the changes between the original archive file and the target archive file, and also comprises a set of entries corresponding to the entries in the target archive file that are not contained in the original archive file. The difference archive file is transmitted to the client computer, instead of requiring that the entire target archive file be transmitted. At the client computer, the difference archive file is applied to the original archive file to produce a synthesized archive file, wherein the synthesized archive file is functionally identical to the target archive file, and wherein each entry in the synthesized archive file is identical to a corresponding entry in the target archive file.

BRIEF DESCRIPTION OF THE DRAWINGS

The accompanying drawings, which are incorporated in and constitute a part of this specification, illustrate an embodiment of the invention and, together with the present description, serve to explain the principles of the invention.

In the drawings.

DETAILED DESCRIPTION

Figure 1:
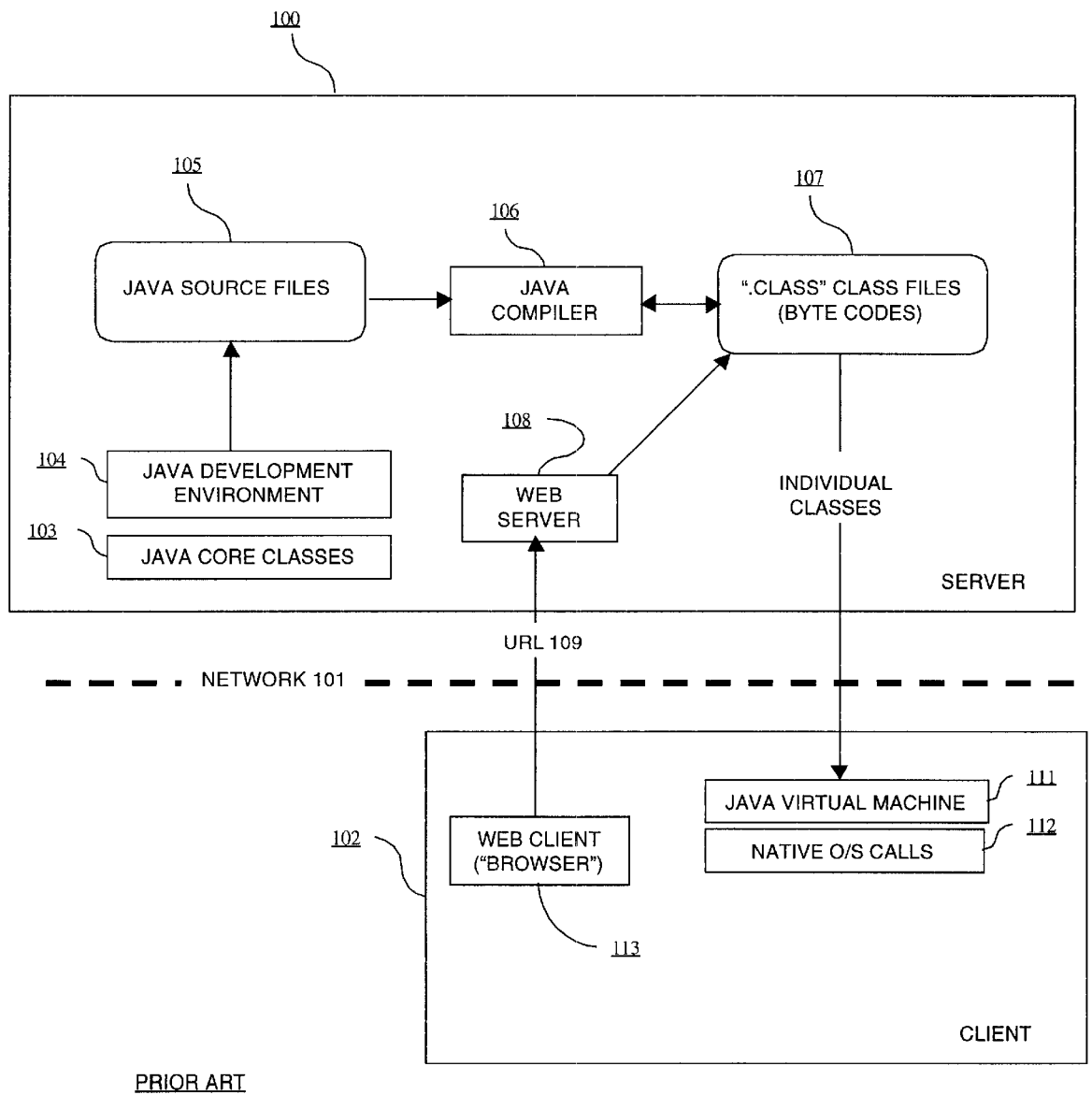
FIG. 1 depicts a block diagram of a client/server computer system architecture illustrating the process of creating and downloading individual class files.

One embodiment of the present invention is described herein in the context of the Java™ programming language and the Java™ software paradigm. Those of ordinary skill in the art will realize that the following description of the present invention is illustrative only and not in any way limiting. Other embodiments of the invention will readily suggest themselves to such skilled persons having the benefit of this disclosure. For example, any number of computer programming languages, such as the Java™language, C, C++, Pascal, Smalltalk, FORTRAN, assembly language, etc., may be used. Further, various programming approaches such as procedural, object oriented or artificial intelligence techniques may be employed, depending on the requirements of each particular implementation.

Reference will now be made in detail to an implementation of the present invention as illustrated in the accompanying drawings. The same reference numbers will be used throughout the drawings and the following description to refer to the same or like parts.

In the context of the present invention, the following definitions apply.

A "file" is a set of binary information arranged in a specified order (i.e., the "file contents") having a file name to identify the file. "File contents" refers to the bit-by-bit information contained in a file. A "file name" is the set of letters, numbers, and symbols assigned to a file to distinguish it from all other files in a file system. In the context of the present invention, a file name includes the file path and the file extension, if any.

Two file names are "identical" if the two files in question have the same file names, including the same file path and file extension, if any. Two files have identical file contents if the two files in question have the same file size and if a bit-by-bit comparison of the two files indicates that there are no differences between the two files. Nothing precludes the use of other comparison widths (e.g., byte-by-byte, 32-bit-word-by-32-bit-word, etc.). Two files may have the same file names but different file contents, and two files may have the same file contents but different file names.

An "archive file" is any file organized into a set of one or more entries, where each entry is itself a file. Each entry in the archive file may comprise any file type, including (without limitation) text files, image files, multimedia files, sound files, video files, application code, class files, and even archive files. Thus, each entry in an archive file may itself be an archive file. Each of the individual entries in the archive file may or may not be compressed, encrypted and/or otherwise encoded. A JAR file is one type of archive file, but is not the only possible type of archive file.

An "original archive file" is an archive file that is assumed to be already in existence, where the entries in the original archive file collectively would typically represent the resources required to execute a computer program. For example, an original archive file may represent "version 1.0" of a computer program. In the case of a JAR archive file, the JAR file would typically contain all the class files, audio files, image files, resource bundles, property files, and other resources required to execute an applet or application.

A "target archive file" is an archive file that would result from making changes to the program code represented by an original archive file, where the entries in the target archive file collectively would typically represent the resources required to execute an updated version of the computer program represented by the original archive file. For example, a target archive file may represent "version 1.1" or "version 2.0" of the computer program represented by the original archive file. Nothing precludes the possibility that the target archive file may be completely unrelated to the computer program represented by the original archive file. However, as will be described in more detail below, aspects of the present invention exhibit the best performance (in terms of file size ratio between the target archive file and the "difference archive file") when at least some of the entries in the target archive file are expected to be identical to some of the entries in the original archive file.

A "difference archive file" is a file that describes the changes between an original archive file and a new archive file. As will be described in more detail later, in one embodiment of the present invention, a difference archive file comprises an index file describing the changes between the original archive file and the target archive file, and also comprises a set of entries corresponding to the entries in the target archive file that are not contained in the original archive file. Nothing precludes implementing the difference archive file using any other suitable file structure.

A "synthesized archive file" is an archive file that results from applying a difference archive file to an original archive file. As will be described in more detail later, a synthesized archive file according to aspects of the present invention is functionally identical to the target archive file, although it may not be structurally identical. That is, in one embodiment of the present invention, the file contents and file names of the entries in the synthesized archive file are identical to the corresponding entries in the target archive file. However, the file contents of the synthesized archive file may not be identical to the file contents of the target archive file. If so desired for a particular implementation, a synthesized archive file may also contain additional entries not found in the target archive file (e.g., entries found in the original archive file that have been deleted), so long as the synthesized archive file contains at least all of the entries in the target archive file, where these entries have the same file contents and file names as the corresponding entries in the target archive file.

Figure 2:
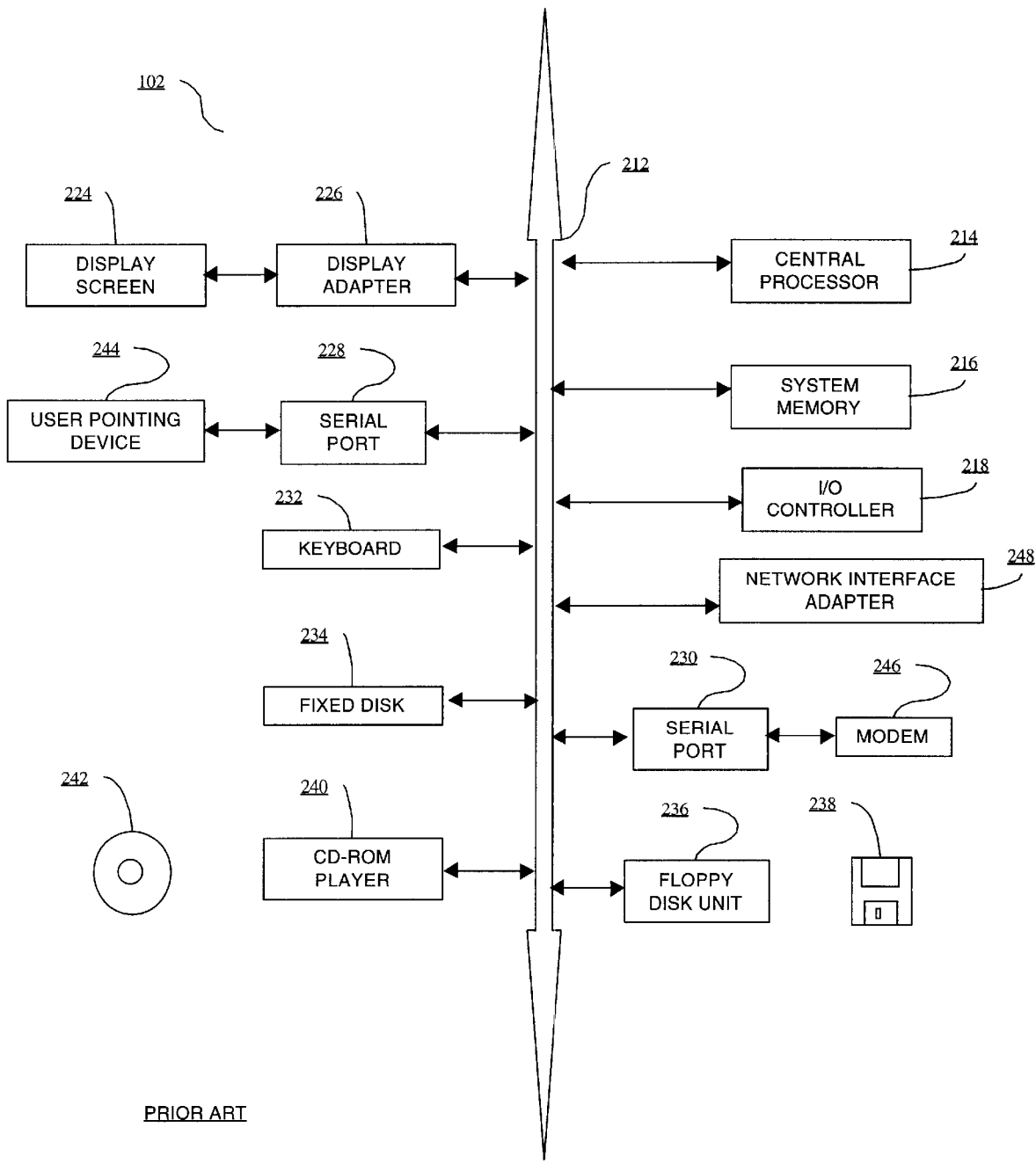
FIG. 2 depicts a block diagram of a client computer system suitable for implementing aspects of the present invention.

FIG. 2 depicts a block diagram of a client computer system 102 suitable for implementing aspects of the present invention. As shown in FIG. 2, client computer system 102 includes a bus 212 which interconnects major subsystems such as a central processor 214, a system memory 216 (typically RAM), an input/output (I/O) controller 218, an external device such as a display screen 224 via display adapter 226, serial ports 228 and 230, a keyboard 232, a fixed disk drive 234, a floppy disk drive 236 operative to receive a floppy disk 238, and a CD-ROM player 240 operative to receive a CD-ROM 242. Many other devices can be connected, such as a user pointing device 244 (e.g., a mouse) connected via serial port 228, and a modem 246 connected via serial port 230. Modem 246 may provide a direct connection to a remote server via a telephone link or to the Internet via a POP (point of presence). Alternatively, a network interface adapter 248 may be used to interface to a local or wide area network using any network interface system known to those of ordinary skill in the art (e.g., Ethernet, DSL, AppleTalk™).

Many other devices or subsystems (not shown) may be connected in a similar manner. Also, it is not necessary for all of the devices shown in FIG. 2 to be present to practice the present invention, as discussed below. Furthermore, the devices and subsystems may be interconnected in different ways from that shown in FIG. 2. The design and operation of a computer system such as that shown in FIG. 2 is readily known in the art and is not discussed in detail in this application, so as not to overcomplicate the present discussion. Code to implement the present invention may be operably disposed in system memory 216 or stored on storage media such as fixed disk 234 or floppy disk 238.

Figure 3:
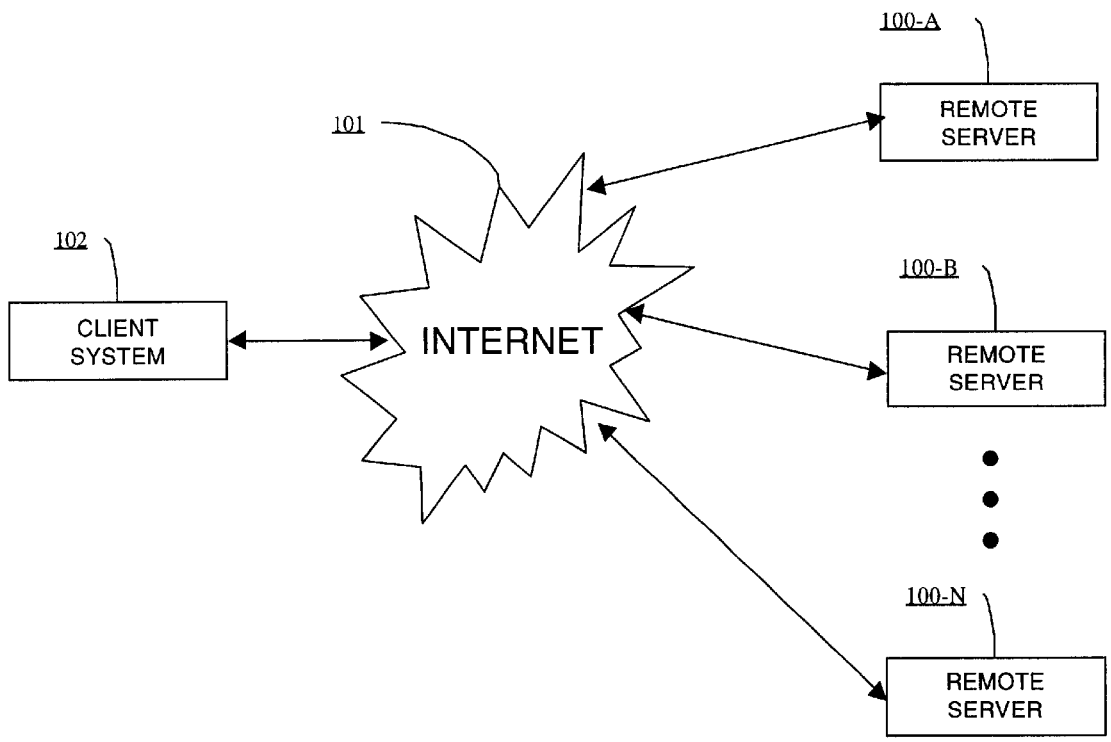
FIG. 3 depicts the interconnection of a client computer system to remote servers in accordance with aspects of the present invention.

FIG. 3 depicts the interconnection of client computer system 102 to remote servers 100-A–100-N. FIG. 3 depicts a data communication network 101 such as the Internet interconnecting remote servers 100-A–100-N. Modem 242 (see FIG. 2), network interface adapter (see FIG. 2), or some other network interface on client computer system 102 provides the connection from client computer system 102 to the Internet 101. Protocols for exchanging data via the Internet are well known and need not be discussed herein. Although FIG. 3 depicts the use of the Internet for exchanging data, the present invention is not limited to the Internet.

One well-known application of the Internet is the World Wide Web ("WWW"). Remote servers 100-A–100-N may each provide access to a web site. To access WWW documents available on remote servers 100-A–100-N, client computer system 102 typically operates a Hypertext Markup Language ("HTML") browser program. A commercially-available browser that may be used for this purpose is the HotJava™ browser, available from Sun Microsystems, Inc. Other commercially available browsers include Netscape™ Navigator™ and Microsoft™ Internet Explorer™. As is known to those of ordinary skill in the art, the HyperText Transfer Protocol ("HTTP") is typically used to transmit information between client computer system 102 and remote servers 100-A–100-N.

Figure 4:
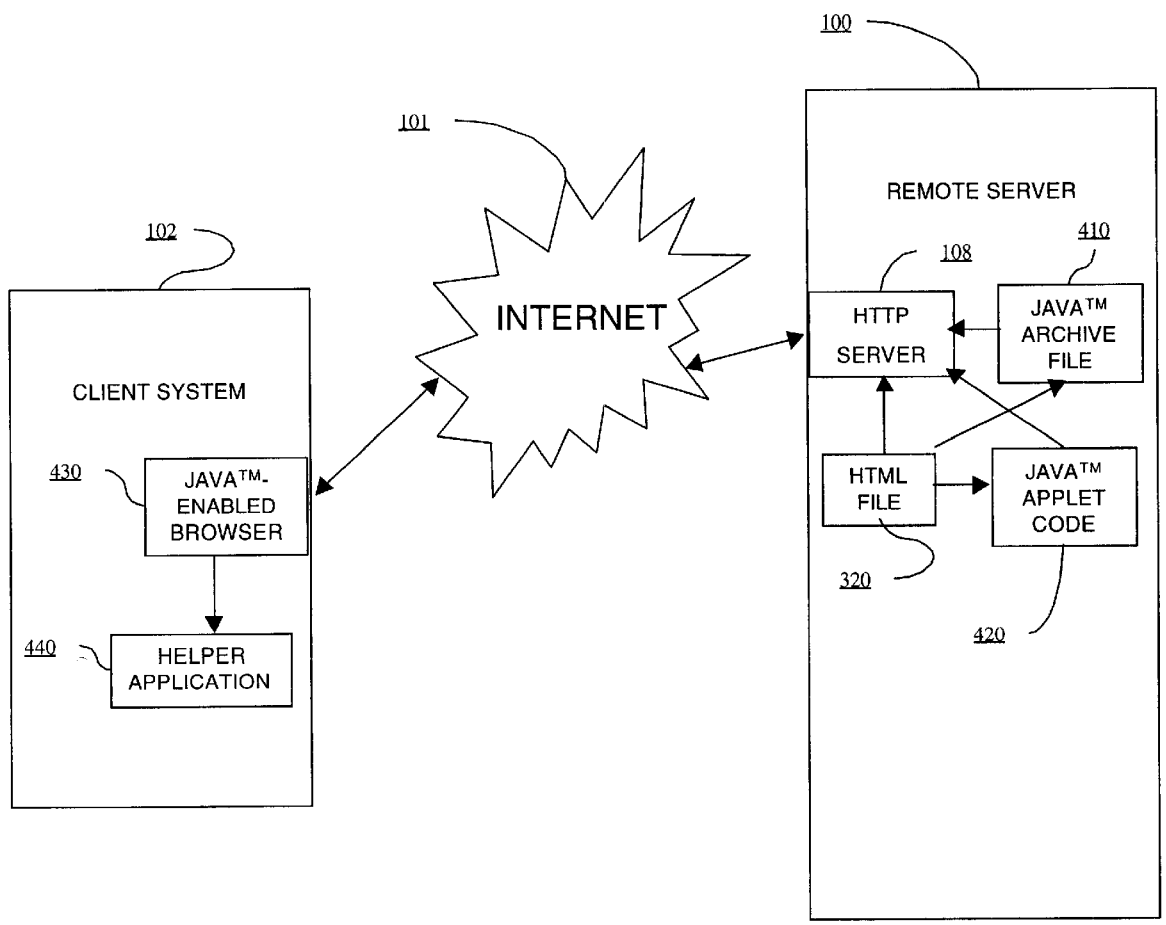
FIG. 4 depicts a block diagram of an applet model for net deployment of applications known to those of ordinary skill in the art.

FIG. 4 depicts a block diagram of an applet model for net deployment of applications known to those of ordinary skill in the art. As shown in FIG. 4, server 100 comprises a HyperText Transfer Protocol ("HTTP") server 108 capable of transferring files such as HTML file 320 to client computer 102 via Internet 101. At client computer 102, a web browser 430 has been installed.

According to the Java™ Applet model known to those of ordinary skill in the art, browser 430 is "Java™-enabled," meaning that it includes at least one version of the Java™ Runtime Environment ("JRE"). Helper applications 440 may also be installed on client computer 102. In the context of the present invention, a helper application is a stand-alone application that is invoked by a browser when a file of a specified file type is encountered by the browser. Typically, the helper application must be "registered" with the browser for a specified file type, so that the browser knows to invoke the correct helper application when the specified file type is encountered. For example, those of ordinary skill in the art will recognize that the Adobe™ Acrobat™ Reader application is commonly associated with the ".pdf" file type. Unlike "plug-ins," helper applications typically execute as separate processes with respect to the browser 430.

Still referring to FIG. 4, according to the Applet model, HTML file 320, originally stored on the server computer 100, may include a link invoking a Java™ Applet 420. One such link may appear as follows within the HTML code comprising HTML file 320:

<APPLET code="SampleApplet.class" CODEBASE= "http://www.xyz.com/appletsdir/" HEIGHT=300 WIDTH=400> </APPLET>

When Java™-enabled browser 430 encounters a link (also known as a "tag") such as the link shown above, it is able to download the specified applet (e.g., "SampleApplet") code from a location specified by the CODEBASE parameter (e.g., http://www.xyz.com/appletsdir/), and to then execute the applet within the browser environment. This is possible because, by definition, Java™-enabled browsers are capable of interpreting and executing Java™ Applets using a version of the JRE that forms part of the browser application. Typically, if a CODEBASE parameter is not provided, the Universal Resource Identifier ("URI") of the location where HTML file 320 was stored on server 100 is used. As is known to those of ordinary skill in the art, the "lifetime" of the specified applet is limited by the lifetime of the browser, and may terminate as soon as a user leaves the web page from which the applet was launched. It should also be noted that Applets are typically executed within browser windows, as the above link example clearly indicates (specifying the height and width of the applet window to be opened).

As has been mentioned earlier, those of ordinary skill in the art know that certain Java™ implementations also allow the specified applet "class" to be loaded from a Java™ Archive file (also called a ".jar file," or "JAR file") that is typically downloaded before the specified Java™ applet class is located. Archive files such as JAR files enable application or applet developers to include all the code and data files necessary to execute a given application or applet in a single compressed file, thereby providing enhanced download speeds and making it less complicated to distribute applications in networked environments. For example, the following HTML code may be used to specify an archive file:

<APPLET ARCHIVES="myarchive.jar" CODE= "SampleApplet.class">

. . .

</APPLET>

When a Java™-enabled browser such as browser 430 shown in FIG. 4 encounters the above HTML code, it first downloads the "myarchive.jar" archive file 410 from server 100, then attempts to find the "SampleApplet.class" code within the downloaded "myarchive.jar" archive file 410. If the browser cannot locate the specified class in the archive file 410, it searches at the location specified by the CODEBASE parameter, as before. Specifying an archive file in an APPLET tag represents a performance optimization, instructing the browser to pre-load a specified archive and to use that archive, if possible, when locating classes comprising Java™ applet code. If the archive file 410 is not found, or if a required class file is not found within the specified archive, then the usual class location procedures described above may be used.

Most current net deployment schemes of program code implement security by providing the option of signing the code. Code signing is a technique that allows one to verify who wrote the code, and to verify that it has not been tampered with since it was signed. However, code signing does not really provide security, it merely lets one know who to blame if something goes wrong.

The Java™ platform supports code signing as well, but it goes further. It can provide security against both intentional and unintentional malicious code, by making it possible to restrict the access that a Java™ application has to a user's machine and local network. Many of the applications that are in use today are net-centric, so they do not need access to local stored data. Thus, this sort of restriction, or "sandboxing," of an application makes sense for these types of applications. For example, if a user starts executing a stock-quote ticker application from xyztrade.com's website, in this case, the application only needs access to xyztrade.com's server to obtain the requested quotes. There is no need for such an application to access the data or file system on the user's local machine. By sandboxing such applications, a user can be certain about the integrity of his or her system, and that none of his or her potentially sensitive information is being compromised.

Figure 5:
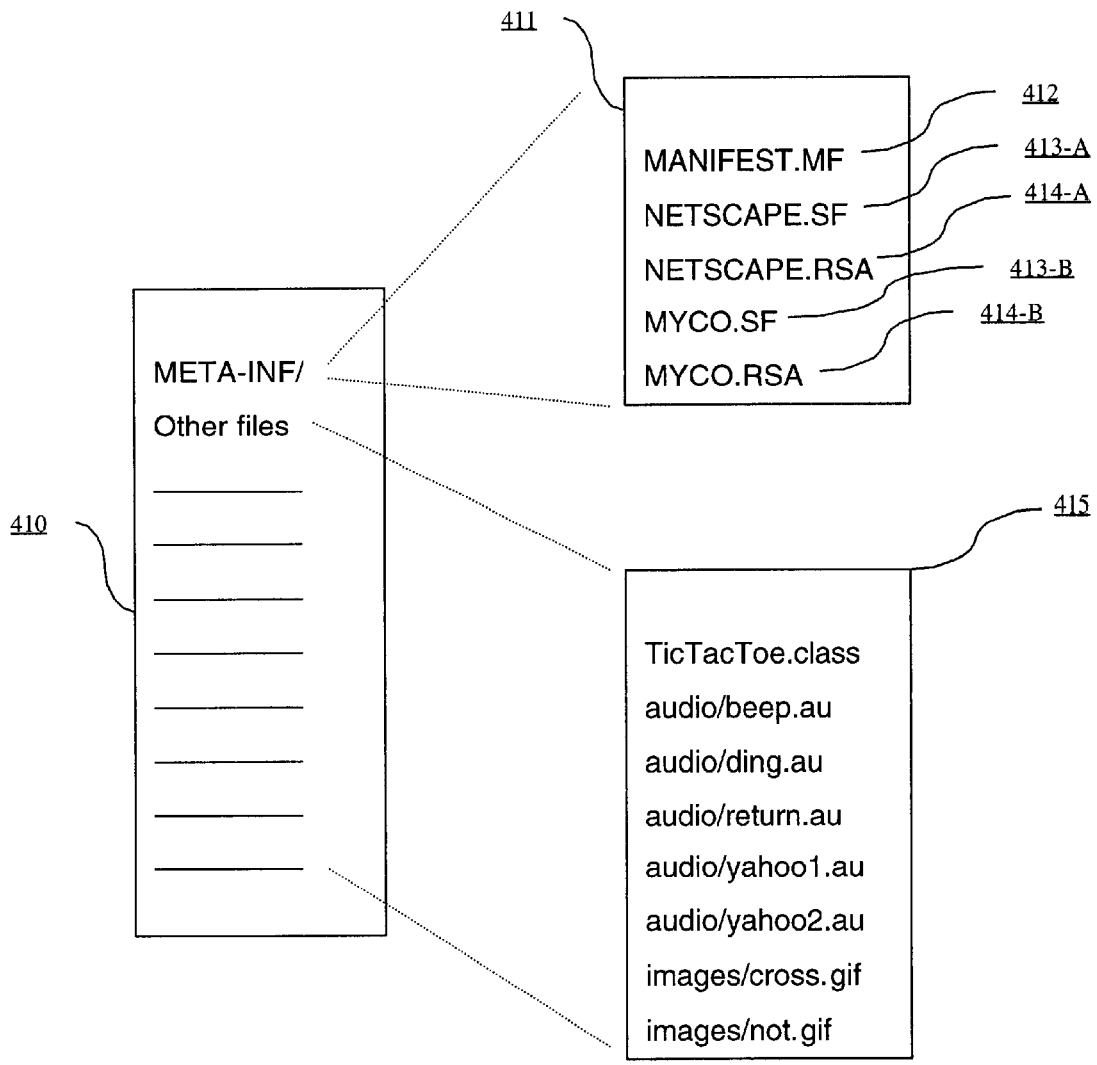
FIG. 5 is a block diagram illustrating the structure of a typical JAR file.

Thus, a JAR file is a standard and convenient method of packaging a Java-based application. As is known to those of ordinary skill in the art, a JAR archive file typically contains a manifest file named META-NF/MANIFEST.MF within the archive file. This file contains information about the other files within the JAR file. Applications that work with JAR files need to access the information contained in the manifest file. Referring to FIG. 5, there is shown a block diagram illustrating the structure of a typical JAR file 410. JAR file 410 has a subdirectory 411 of meta-information that is always named META-INF. The subdirectory 411 contains a single Manifest file 412 that is always named MANIFEST.MF. The MANIFEST.MF file contains arbitrary information about the files in the archive, such as their encoding or language. The JAR file 410 is also capable of containing zero or more signature files named name.SF 413. There is one of these files for each entry that has signed files in the archive. In addition, the JAR file may contain zero or more digital signature files named name.suf 414, where the suffix (e.g., RSA) is determined by the digital signature format. There is at least one of these files for each signature instruction file. In addition to the MANIFEST.MF subdirectory 411, the archive contains whatever files 415 a user wishes to package in the archive, such as files to be installed for an automatic software installation feature.

Figure 6:
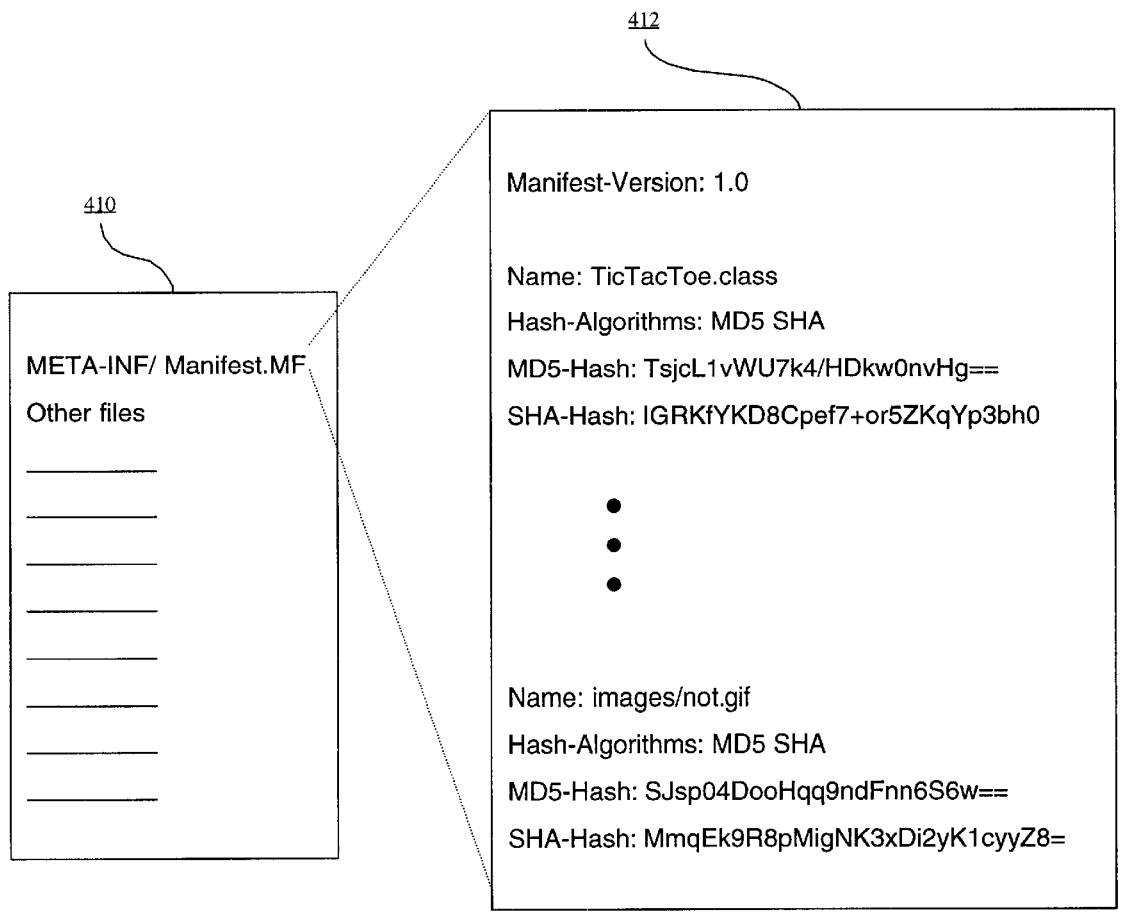
FIG. 6 is a block diagram illustrating a typical JAR file and exemplary details contained in a manifest file within a standard subdirectory in the JAR file.

Referring to FIG. 6, there is shown a JAR file 410 with a standard subdirectory 411 of meta-information named META-INF, with a manifest file 412 named MANIFEST.MF. The manifest file 412 lists all the files 415 (see FIG. 5) in the archive, together with values labeled "MD5-Hash" and "SHA-Hash." As is known to those of ordinary skill in the art, MD5 and SHA are message digests, also known as one-way hash functions. A hash function takes an arbitrary piece of input data and produces a piece of output data of a fixed size. MD5 hashes are 128 bits long; SHA hashes are 160 bits long. The term "one-way" refers to the fact that, given an arbitrary piece of input data, a hashed result may be obtained. However, this is not a reversible process. That is, it is generally not possible to determine the original input data based solely on the hashed result. With most practical one-way hash functions currently known to those of ordinary skill in the art, it is difficult (but not impossible) to produce the same hashed result from two different inputs. As will be described in more detail later, in the context of the present invention the result of applying a one-way hash function to a file (whether it be MD5, SHA, a simple check-sum, or any other suitable function known to those of ordinary skill in the art) can be used as a proxy for the actual file contents for the purpose of determining whether two files have different file contents. If the hashed representations of the two files are different, then the two files are deemed to have different file contents. However, if the hashed representations of the two files are the same, then the complete bit-by-bit contents of the two files in question must be compared (since it is theoretically possible for two files to have the same hashed representations, yet have different file contents).

As is known to those of ordinary skill in the art, the message digests in a manifest file may be used to confirm that the archive file 410 has not undergone accidental corruption. As a browser 430 (see FIG. 4) reads each file from the archive file 410, it can compute the MD5 and SHA values independently and check them against those listed in the manifest file 412. Deliberate corruption, however, cannot be ruled out, because anyone who intentionally corrupts an archive file 412 can also modify the manifest file's corresponding hash value.

It is possible, however, to detect deliberate corruption of the files in a JAR archive file 410. To do so, the JAR archive file 410 must be "signed." Code signing is analogous to signing a paper document with a pen. It indicates, with certainty, that the given JAR file 410 came from the indicated source. In fact, a digital signature is stronger than a physical one. It is harder to forge, cannot be repudiated by the signer, and the signed document cannot be modified. Various forms of code signing are known to those of ordinary skill in the art, and are not discussed in further detail herein so as not to overcomplicate the present disclosure.

Figure 7:
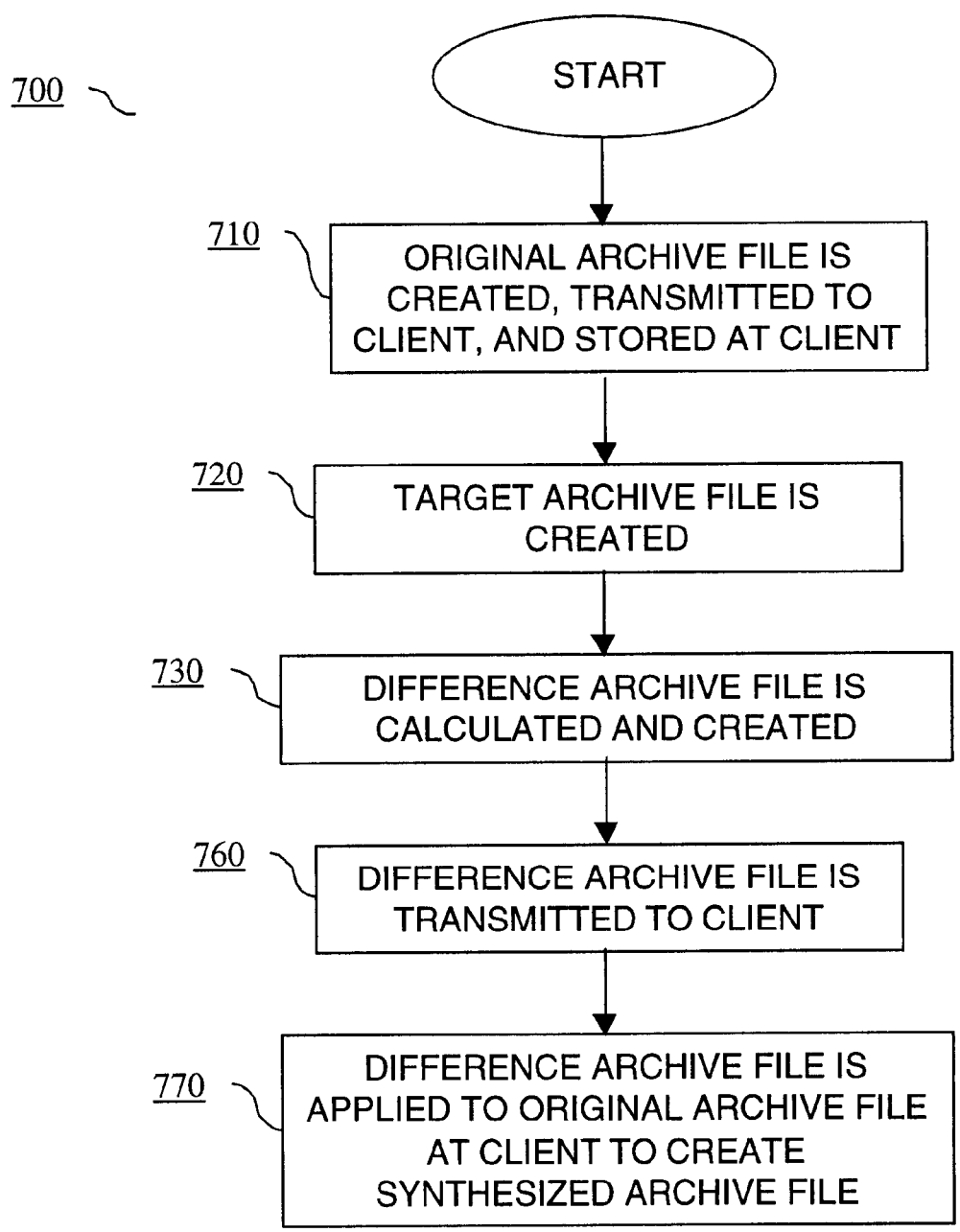
FIG. 7 is a flow chart illustrating a method for enabling incremental updating of program code in accordance with aspects of the present invention.

FIG. 7 is a flow chart illustrating a method for enabling incremental updating of program code in accordance with aspects of the present invention. Referring now to FIG. 7, at step 710, the original archive file is created, transmitted to client computer system 102 (see FIG. 1), and stored at client computer system. The original archive file may be created using any technique known to those of ordinary skill of the art. For example, in the context of a Java™ implementation, the original archive file may be created in accordance with the process described earlier with reference to FIG. 1 (except that a JAR file would also be created in the manner described earlier). Still referring to step 710, the original archive file may be transmitted to client computer system 102 using any technique known to those of ordinary skill of the art (e.g., by transmitting the original archive file to client computer system 102 from a server 100 via a data communication network 101 such as the Internet in response to request from a Web browser 113 at client computer system 102, or by copying the original archive file from a floppy disk or CD-ROM disk to client computer system 102). Regardless of the specific manner in which the original archive file is created and transmitted to client computer system 102, in the context of the present invention, the original archive file is assumed to exist at both server 100 at client 102 before a difference archive file (described below) is created.

At step 720, the target archive file is created. Just as the original archive file, the target archive file may be created using any technique known to those of ordinary skill of the art. As mentioned earlier, the target archive file is typically the result of updating the program code represented by the original archive file to a new version, although this is not necessary. However, the present invention exhibits best performance in terms of the ratio of file size between the target archive file and the difference archive file when at least some of the entries in the target archive file have file contents that are identical to some of the entries in the original archive file. This will typically be true when the target archive file represents a version update to the program represented by the original archive file. As will be described in more detail later, when the number of files in the target archive file that have different file contents with respect to the files in the original archive file is relatively small, the resulting difference archive file will typically have a much smaller file size than the target archive file. The target archive file may or may not be created using the same computer that was used to create the original archive file. The only requirement is that both the original archive file and the target archive file must be available and accessible before executing step 730.

At step 730, the difference archive file is calculated and created by comparing the original archive file to the target archive file in accordance with aspects of the present invention. A detailed discussion of an exemplary implementation of step 730 will be described later. Regardless of the specific sub-steps used to implement step 730, the result of executing step 730 will be a file (called the difference archive file) that contains all of the entries that are "new" in the target archive file (i.e., the entries in the target archive file with file contents that are not equal to the file contents of any of the files in the original archive file), along with a set of instructions for creating a synthesized archive file based only on the original archive file and the difference archive file.

At step 760, the difference archive file is transmitted to client computer system 102 (see FIG. 1). The specific manner in which the difference archive file is transmitted to client computer system 102 is not critical, and may be implemented in any manner known to those of ordinary skill in the art. In the context of a Java™ implementation, the difference archive file may be transmitted to client computer system 102 from a server 100 via a data communication network 101 such as the Internet in response to a request from a Web browser 113 at client computer system 102. In one embodiment, the difference archive file has the same structure and file extension as a typical JAR file.

At step 770, once the difference archive file has been transmitted to client computer system 102, it is applied to the original archive file assumed to be already present at client computer system 102 to generate a synthesized archive file. A detailed discussion of an exemplary implementation of step 770 will be described later. Regardless of the specific sub-steps used to implement step 770, the result of executing step 770 will be a file (called the synthesized archive file) that is functionally identical to the target archive file. That is, the synthesized archive file will have all of the entries in the target archive file, and these entries will have the same file names and file contents as in the target archive file. However, the file contents of the synthesized archive file may be different from the file contents of the target archive file (e.g., the entries may appear in a different order in each archive file, and/or the synthesized archive file may have additional entries not found in the target archive file).

Figure 8:
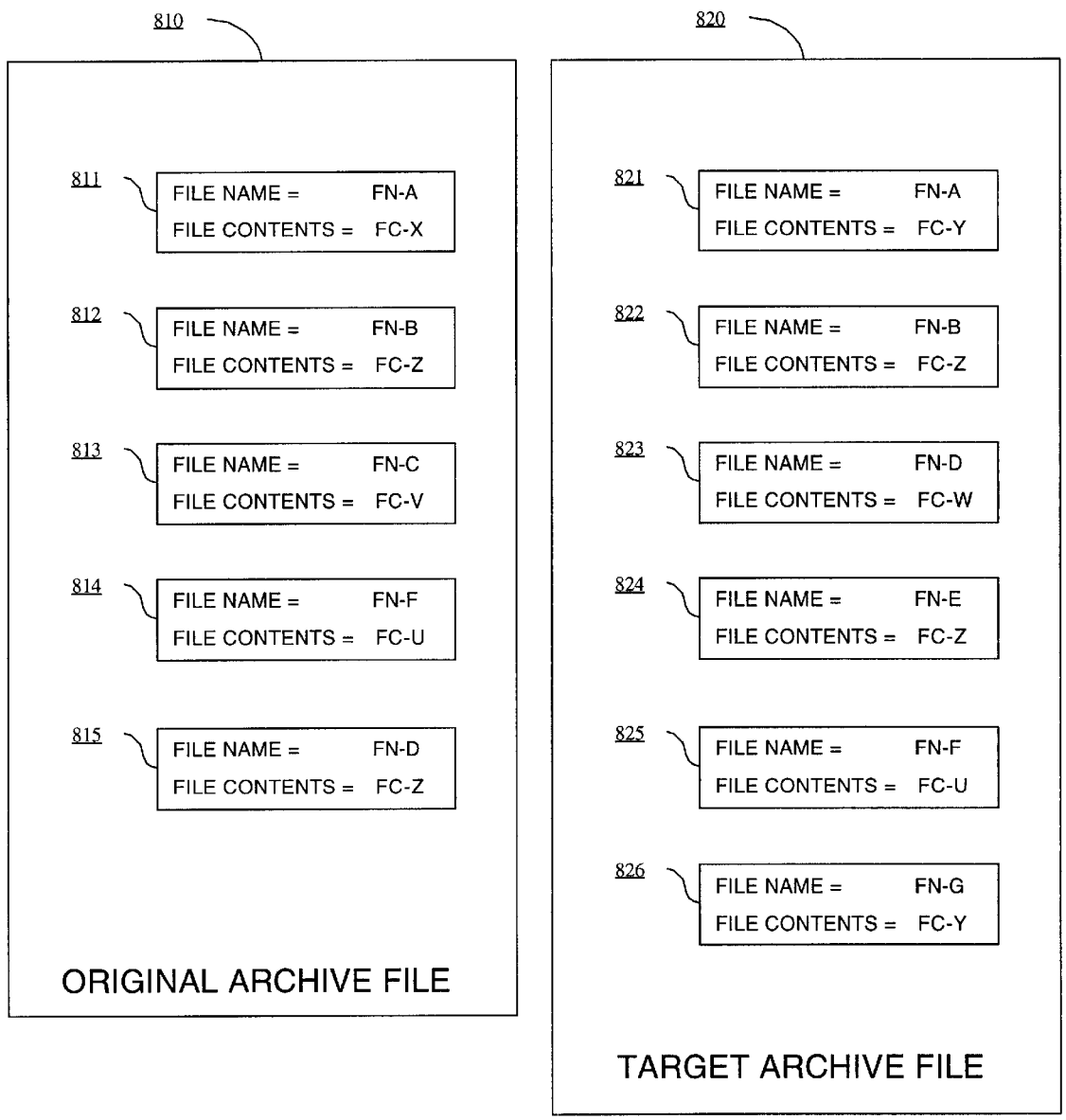
FIG. 8 depicts a block diagram illustrating the file names and file contents of the entries in an exemplary original archive file and an exemplary target archive file according to aspects of the present invention.

For the sake of clarification, a detailed example will now be provided. FIG. 8 depicts a block diagram illustrating the file names and file contents of the entries in an exemplary original archive file 810 and an exemplary target archive file 820 according to aspects of the present invention. As shown in FIG. 8, original archive file 810 contains five entries 811, 812, 813, 814, and 815. Each entry has a unique file name (denominated with the prefix "FN-") and a set of file contents (denominated with the prefix "FC-"). In a typical implementation, the file name would include a path name, a file name, and possibly a file extension, but in the simplified diagram illustrated in FIG. 8, the file name is shown as a single unique letter (e.g., "A," "B," "C," "F," and "D"). Similarly, the file contents of each entry typically comprise an array of bytes (which can be very large, depending on the file size of each entry). However, in the simplified diagram illustrated in FIG. 8, the file contents are shown as a single letter (e.g., "X," "Z," "V," "U," and "Z"). In some cases, the file contents can be represented as the result of executing any suitable one-way hash function on the actual file contents of an entry (e.g., an ordinary checksum, MD5 hash function, or SHA hash function). However, because it is possible for two files to have different file contents yet share the same hash function result, the hash function result can only be used reliably to determine that the file contents of two entries are different. In other words, if two files have two different hash function results, they are guaranteed to have different file contents. However, if two files have the same hash function result, they are not guaranteed to have the same file contents. When two files have the same hash function result, the actual file contents must be compared to determine whether the file contents are the same or not.

It should be noted that the file name of each entry should be unique. This does not preclude the possibility (in a real implementation) that two files may have the same file "name," so long as their path name and/or file extension is different. Also, it should be noted that nothing precludes the possibility that two entries will have the same file contents, even though they may have different file names. For example, in FIG. 8, entries 812 and 815 have the same file contents.

Still referring to FIG. 8, target archive file 820 is shown as having six entries 821, 822, 823, 824, 825, and 826. The labeling convention for the entries in the target archive file 820 in terms of file names and file contents are the same as in the original archive file described above. As would be expected in the case of a version update to program code, there is some overlap between the original archive file 810 and the target archive file 820 shown in FIG. 8. Specifically, entry 822 in the target archive file 820 is identical to entry 812 in the original archive file 810 (i.e., the file names and the file contents of the two entries are identical). The same is true of entries 825 and 814. Next, it should be noted that the original archive file 810 contains an entry (i.e., entry 811) having the file name "FN-A," and that the target archive file 820 also contains an entry (i.e., entry 821) with the same file name. However, the file contents of these two entries are different. Specifically, the file contents of entry 811 in the original archive file 810 are "FC-X," whereas the file contents of entry 821 in target archive file 820 are "FC-Y." In a real implementation, this situation would represent the case where a file (such as a Java™ class file) has been modified.

It should further be observed that target archive file 820 may contain entries in that are "new" in the target archive file. For example entry 826 in the target archive file 820 has a file name (i.e., "FN-G") that does not appear in the original archive file 810. However, it should be noted that the file contents of entry 826 happen to be identical to the file contents of another entry (i.e., entry 821) in the target archive file 820. Entry 824 in the target archive file 820 also has a file name (i.e., "FN-E") that does not appear in the original archive file 810. However, the file contents of entry 824 are identical to the file contents of another entry (i.e., entry 822) in the target archive file 820 and identical to the file contents of an entry (i.e., entry 812) in the original archive file 810. Naturally, although this situation is not shown in FIG. 8, is possible that a new entry in a target archive file may have file contents that are not identical to any other entries in either the target archive file or in the original archive file.

Finally, it should be observed that some entries may be "deleted" in a target archive file with respect to an original archive file. For example, in FIG. 8, entry 813 in original archive file 810 does not appear at all in target archive file 820. As will be described in more detail later, removal of such files in a synthesized archive file may or may not be necessary, depending on the requirements of each particular implementation. In other words, the presence of "deleted" files such as entry 813 in a synthesized archive file may or may not be significant (even though, by definition, such files would not be present in the actual target archive file).

Figure 9:
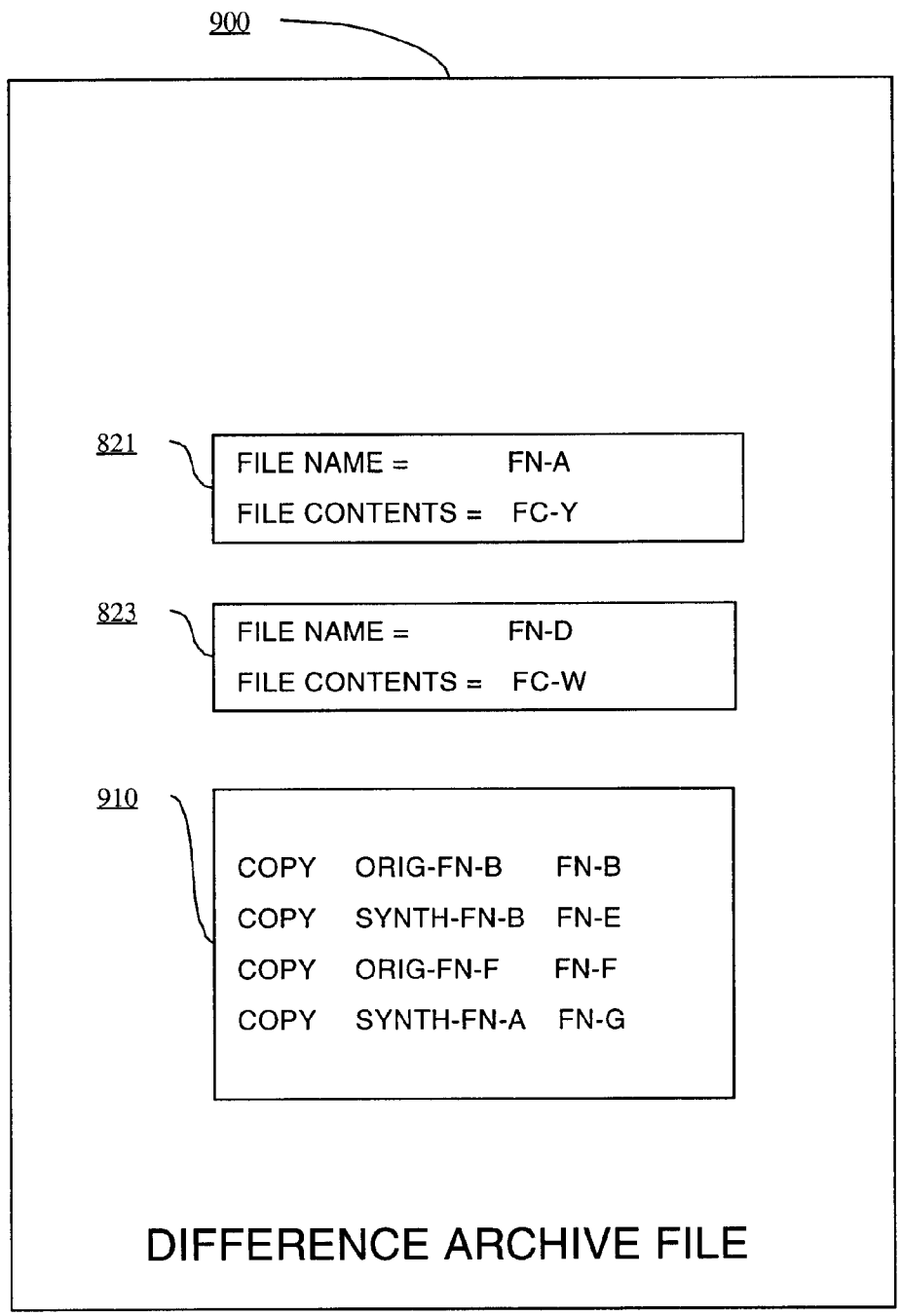
FIG. 9 depicts a block diagram illustrating the file names and file contents of the entries in a first exemplary difference archive file according to aspects of the present invention.

FIG. 9 depicts a block diagram illustrating the file names and file contents of the entries in a first exemplary difference archive file 900 according to aspects of the present invention. As shown in FIG. 9, difference archive file 900 comprises a set of entries (e.g., entries 821 and 823 in terms of the example shown in FIG. 8) representing the unique entries in target archive file 820 having file contents not identical to the file contents of any entry in the original archive file 810 and not identical to the file contents of any other entry in the target archive file 820, along with a set of instructions contained within an index file 910 for creating a synthesized archive file based only on the difference archive file 900 and on the original archive file 810.

The accuracy of difference archive file 900 shown in FIG. 9 can be verified by a visual inspection of FIGS. 8 and 9. An exemplary method for systematically generating a difference archive file such as file 900 will be described later with reference to FIG. 11. For the moment, the following observations can be made regarding the difference archive file 900 shown in FIG. 9. First, so long as there is some overlap between the target archive file and the original archive file (i.e., so long as the file contents of at least one entry in the target archive file are identical to the file contents of any entry in the original archive file), the file size of the difference archive file will typically be smaller than the file size of the target archive file, and the difference archive file will typically contain fewer entries than the target archive file. Second, so long as the difference archive file contains a copy of each "new" entry in the target archive file (i.e., each entry in the target archive file having file contents not identical to the file contents of any entry in the original archive file and not identical to the file contents of any other entry in the target archive file) a synthesized archive file can be created by executing a sequence of "copy," and/or "delete" operations on the entries in either the original archive, on the entries in the difference archive file, and/or on the entries in the synthesized archive file in progress.

The precise implementation of each of these operations depend on the requirements of each particular application of the present invention. In some cases, a synthesized archive file will be created "in place," meaning that the original archive file will be overwritten. In other cases, the original archive file will remain intact, and a synthesized archive file will simply be added. Therefore, depending on the particular implementation, a "copy" operation from the original archive file to the synthesized archive file may involve either renaming a file in the original archive file (for an "in place" implementation), copying the file from the original archive file to the synthesized archive file without renaming it, or copying the file from the original archive file to the synthesized archive file and renaming it. Similarly, depending on each particular implementation, it may or may not be necessary to delete "extra" files that were present in the original archive file but not in the target archive file.

With the above observations in mind, the difference archive file 900 shown in FIG. 9 is premised on the assumption that the original archive file will remain intact. Conceptually, a synthesized archive file may be created from difference archive file 900 and original archive file 810 by performing the following sequence of steps. First, entries 821 and 823 are copied from difference archive file 900 into the new synthesized archive file. Next, the commands contained in index file 910 are executed sequentially. Referring now to these commands as shown in FIG. 9, the first command is to copy the entry having file name "FN-B" (i.e., entry 812) from the original archive file to the synthesized archive file. The next command is to copy the entry having file name "FN-B" from the synthesized archive file to an entry having the file name "FN-E" in the synthesized archive file. This operation is possible because, in this example, the entry having file name "FN-B (i.e., entry 812) had already been copied from the original archive file to the synthesized archive file in the previous step. Of course, the entry may alternatively be copied from the original archive file again, if so desired for a particular implementation.

Still referring to index file 910 shown in FIG. 9, the next command is to copy the entry having file name "FN-F" (i.e., entry 814) from the original archive file to the synthesized archive file without changing its file name. The final command listed in index file 910 is to copy the entry having file name "FN-A" in the synthesized archive file (which was created when entry 821 in the difference archive file copied to the synthesized archive file) to an entry having file name "FN-G" in the synthesized archive file. Of course, in this example, the entry may alternatively be copied from the difference archive file again, if so desired for a particular implementation.

It should be noted that no "delete" operations are necessary in the above example, because the example was premised on the assumption that the synthesized archive file would be stored in a new location, leaving the original archive file intact. Similarly, no provisions are necessary in this case to account for the fact that the original archive file and the target archive file may contain files having identical file names but different file contents (such as entry 811 in original archive file 810 and entry 821 in target archive file 820).

As those of ordinary skill in the art will recognize, the process just described with reference to FIG. 9 requires an unnecessarily high number of copy commands, because the command to be performed on each and every entry in the target archive file must be explicitly called out. An optimization can be performed if one assumes that every entry in the original archive file will be copied to the synthesized archive file unless a command in the index file explicitly specifies otherwise. An example taking advantage of this optimization is described next.

Figure 10:
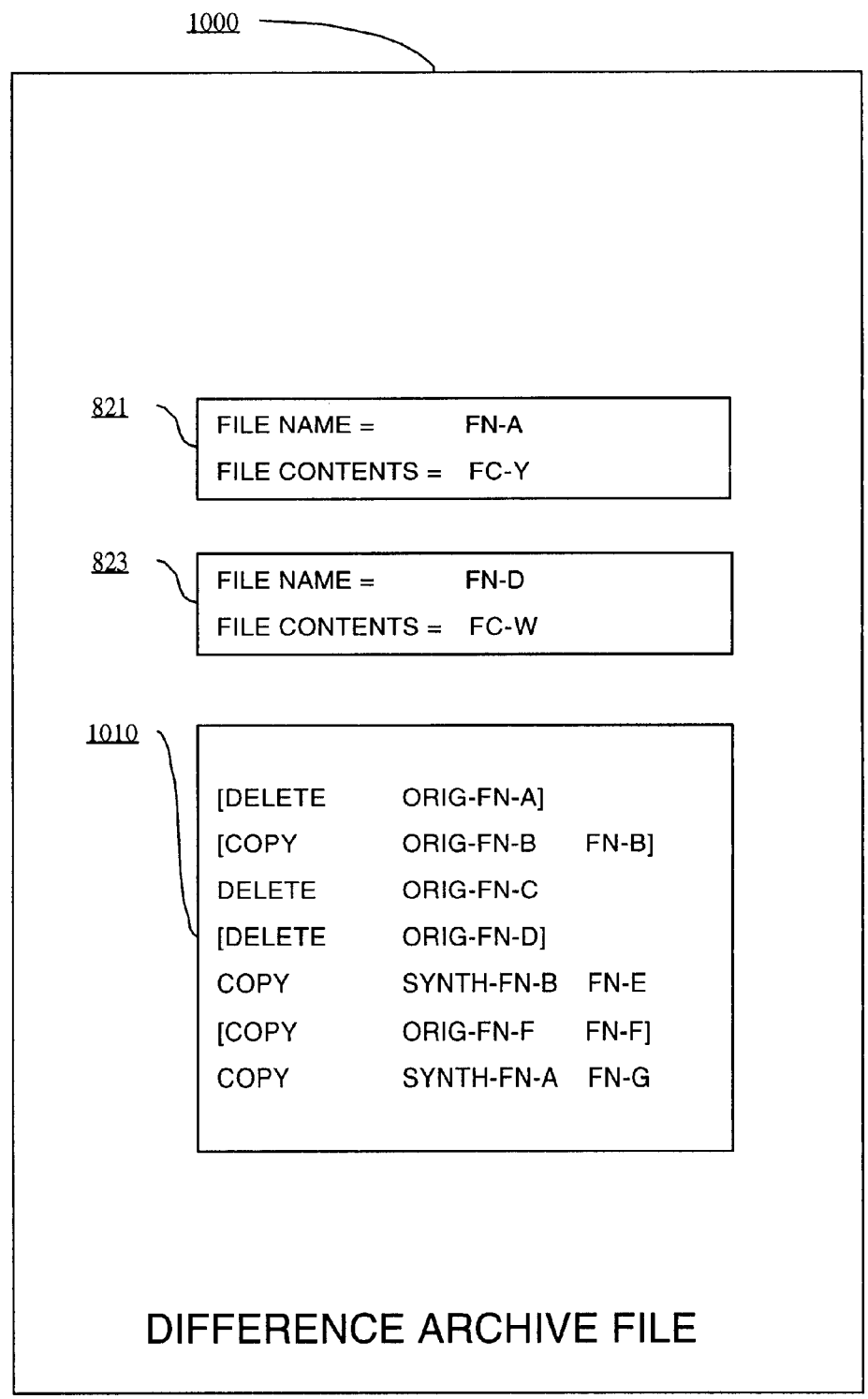
FIG. 10 depicts a block diagram illustrating the file names and file contents of the entries in a second exemplary difference archive file according to aspects of the present invention.

FIG. 10 depicts a block diagram illustrating the file names and file contents of the entries in a second exemplary difference archive file according to aspects of the present invention. The difference archive file 1000 shown in FIG. 10 is premised on the assumption that every entry in the original archive file will be copied to the synthesized archive file unless a command in the index file explicitly specifies otherwise. As in difference archive file 900 shown in FIG. 9, difference archive file 1000 shown in FIG. 10 contains a copy of "new" entries 821 and 823. However, the sequence of operations listed in index file 1010 is different. The first command (i.e., [DELETE FN-A]) is surrounded in square brackets to indicate that it has been implicitly performed already, because the presence of entry 821 (also named "FN-A") implies that entry 811 in the original archive file 810 will not be copied to the synthesized archive file. Therefore, commands that are implicitly performed and listed as surrounded by square brackets in index file 1010 need not be explicitly included in the index file. The next command (i.e., [MOVE FN-B FN-B]) is also implicitly performed already, but for a different reason. In this case, the command has been implicitly performed because the file name and file contents of the entry in the original archive file (i.e., entry 812) and in the target archive file (i.e., entry 822) are identical (i.e., there is no change in the entry). Given the starting assumption of this example (i.e., that every entry in the original archive file will be copied to the synthesized archive file unless a command in the index file explicitly specifies otherwise), this command is redundant.

As has been mentioned earlier, the presence of the next command (i.e., DELETE FN-C) in index file 1010 may or may not be required. If the presence of files such as entry 813 in the synthesized archive file is tolerable, a command to delete such files may not be necessary, even though such files are not present in the actual target archive file. Typically, however, deleting such files is preferable, to avoid unnecessary accumulation of files on a client computer system.

Still referring to FIG. 10, the next command (i.e., [MOVE FN-F FN-F]) is already performed implicitly because the file name and file contents of the entry in the original archive file (i.e., entry 814) and in the target archive file (i.e., entry 825) are identical. Finally, the last command in index file 1010 creates a copy of entry 821 in the difference file and renames the copy to have the file name "FN-G."

Thus, although index file 1010 as shown in FIG. 10 explicitly lists seven commands, at least the four commands surrounded in brackets in the figure and discussed above are not necessary, since they are implicit. And, as was also mentioned above, even the "DELETE ORIG-FN-C" command may not be necessary either.

In summary, performing the steps described above with reference to either FIG. 9 or FIG. 10 results in the creation of a synthesized archive file that is functionally identical to the target archive file. However, the discussion above with reference to FIG. 10 takes advantage of the optimization that can be implemented if one assumes that every entry in the original archive file will be copied to the synthesized archive file unless a command in the index file explicitly specifies otherwise.

Figure 11:
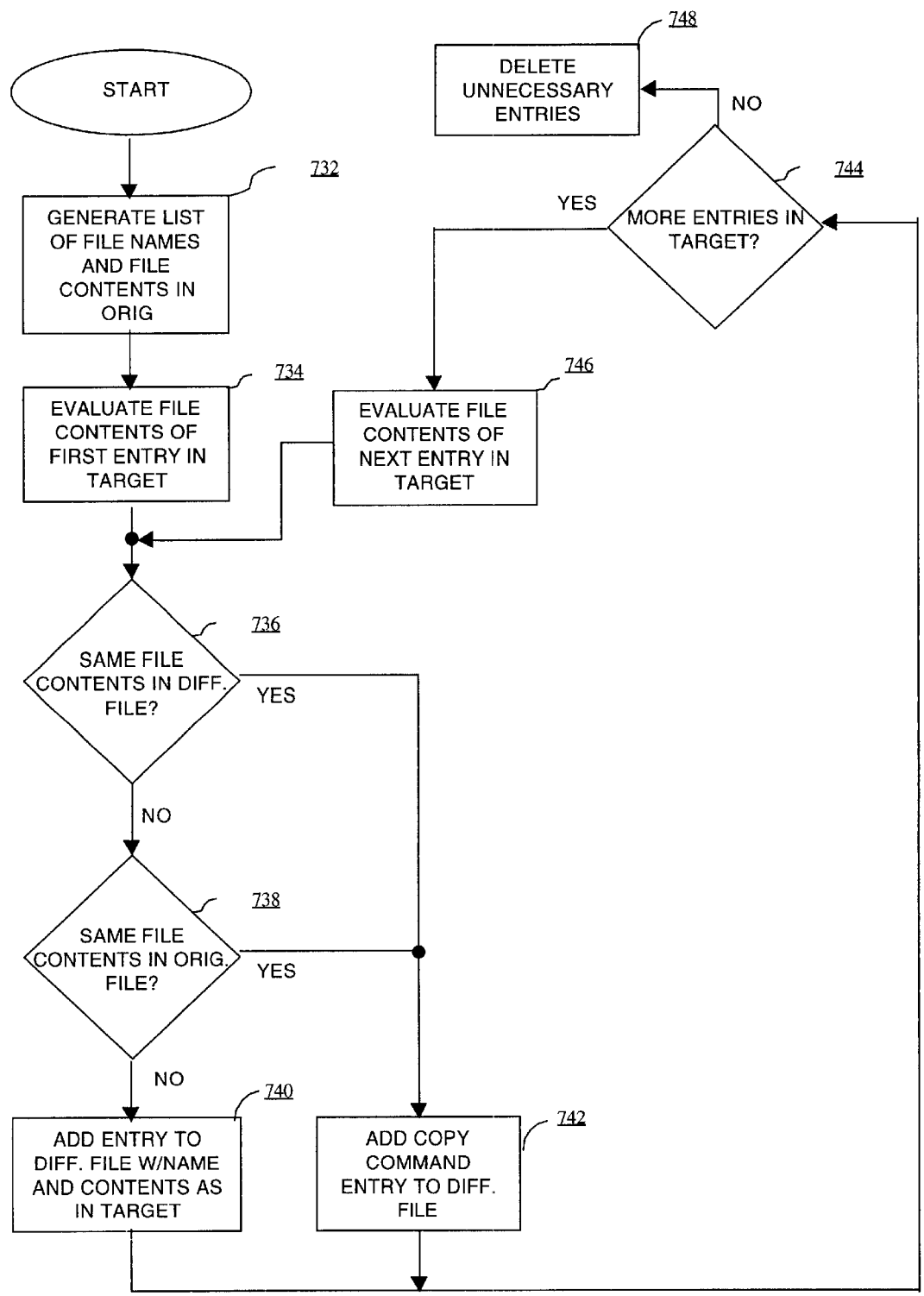
FIG. 11 is a flow chart illustrating an exemplary process for creating a difference archive file in accordance with one embodiment of the present invention.

FIG. 11 is a flow chart illustrating an exemplary process for calculating and creating a difference archive file (i.e., for performing step 730 of FIG. 7) in accordance with one embodiment of the present invention. As shown in FIG. 11, at step 732, a list of file names and file contents in the original archive file is generated. Conceptually, the file contents of each entry comprise the entire set of data in each entry. However, an abbreviated representation of the file contents (e.g., the result of performing a one-way hash function on each entry) can be used for the purpose of verifying that two files have different file contents.

At step 734, the file contents of the first entry of the target archive file are evaluated. At steps 736, the file contents of this entry in the target archive file are compared to the file contents of the entries in the difference archive file to determine if there is an identical match. Conceptually, this step may be implemented by first comparing the hashed representation of the entry in the target archive file to the hashed representation of the entries in the difference archive file to rule out all the files having different hashed representations, and then performing a bit-by-bit comparison on the entries having identical hashed representations. In practice, as those of ordinary skill in the art will recognize, it is extremely unlikely that two files will have the same hashed representation yet have different file contents.

If at step 736 the current entry in the target file is found to have identical file contents as an entry in the difference archive file, then the process proceeds to step 742, described later. If the result of the decision performed at step 736 indicates that the file contents of the current entry in the target archive file being considered are not identical to the file contents of any entry in the difference archive file, then at step 738, the file contents of this entry in the target archive file are compared to the file contents of the entries in the original archive file to determine if there is an identical match.

At step 742, a copy command is added to the difference file with the appropriate arguments. If step 742 was entered from step 736, then the copy command to be added to the difference file will specify that the "source" entry comes from the difference archive file. On the other hand, if step 742 was entered from step 736, then the copy command to be added to the difference file will specify that the "source" entry comes from the original archive file. Continuing with process step 742 shown in FIG. 11, the next step (i.e., step 744) is to determine whether there are any more entries of remaining can be evaluated in the target archive file. If there are no entries remaining in the target archive file, the process ends with step 748, at which point unnecessary files in the original archive file (such as entry 813 shown in FIG. 8) are deleted if so desired for a particular implementation. The set of files in the original archive file that should be "deleted" (i.e., not copied to the synthesized archive file) will consist of those files in the original archive file having file names not matching any of the entries in the target archive file.

Referring back to step 744, if there are more entries remaining in the target archive file to be evaluated, then the process proceeds to step 746, at which point the file contents of the next entry in the target archive file are evaluated. At this point, the process loops back to step 736.

If the result of performing step 738 is that there is no match between the file contents of the current entry in the target archive and the file contents of any entry in the original archive file or in the difference archive file already in progress, then the process continues with step 740. As those of ordinary skill in the art will recognize, step 740 is only performed in the case of a "new" or "modified" entry in the target archive file. At step 740, this new or modified entry is added as an entry to the difference file itself (e.g., entries 821 and 823 shown in both FIGS. 9 and 10). As those of ordinary skill in the art will recognize, entries 821 and 823 shown in both FIGS. 9 and 10 are both "modified" entries in the sense that entries with the same file names but different contents previously existed in the original archive file. Step 740 would also be performed for completely new entries (i.e., entries in the target archive file having files names not matching any file names in the original archive file and having file contents not matching any file contents in the original archive file). In the case of modified files, an "implicit delete" command (such as the "[DELETE FN-A]" and the "[DELETE FN-D]" command shown in FIG. 10) is technically required. However, as mentioned earlier, these implicit delete commands are taken care of because the old files are never copied from the original archive file in the first place. After performing step 740, the process continues with step 744 as described earlier.

Figure 12:
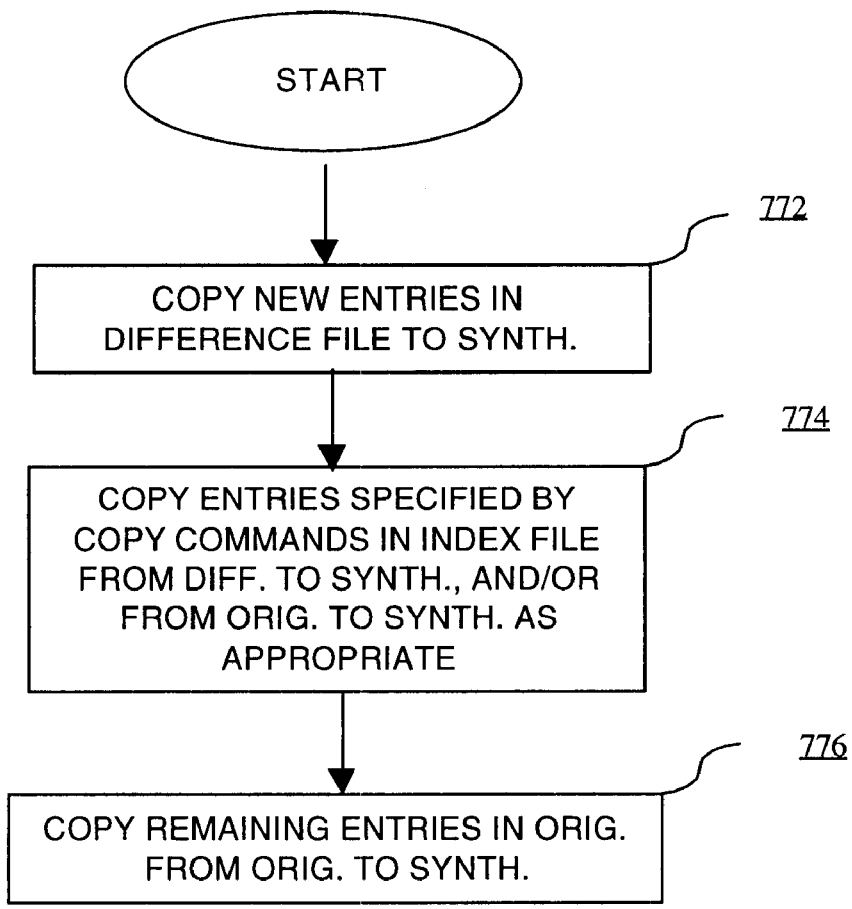
FIG. 12 is a flow chart illustrating an exemplary process for applying a difference archive file in accordance with one embodiment of the present invention.

FIG. 12 is a flow chart illustrating an exemplary process for applying a difference archive file (i.e., for performing step 770 shown in FIG. 7) in accordance with one embodiment of the present invention. At step 772, the new entries in the difference archive file (e.g., entries 821 and 823 shown in both FIGS. 9 and 10) are copied from the difference archive file and to the synthesized archive file. At step 774, the entries specified by copy commands in the index file of the difference archive file are copied from either the original archive file to the synthesized archive file or from the difference archive file to the synthesized archive file, depending on the arguments specified in the copy command. Finally, at step 776, in accordance with the optimizing assumption described above with reference to FIG. 10, all of the remaining entries in the original archive file that are not explicitly listed in the index file are copied to the synthesized archive file. Also, it should be noted that if any "delete" commands are included in the index file, then step 776 can also include the sub-step of removing the "deleted" entries from the list of entries to be copied from the original archive file to the synthesized archive file before copying files from the original archive file to the synthesized archive file. The order in which the steps are performed is not critical, and the steps can be performed in the most appropriate and convenient sequence for each particular implementation. However, in one embodiment, the steps are performed in the sequence described in FIG. 12 so that the new entries are made available initially (by performing step 772) in case these files are referenced by subsequent commands in the index file.

It should also be noted that each entry in an archive file may itself be an archive file. In the above discussion, this case was not treated separately (i.e., if an entry happened to be an archive file, the archive file entry was treated as any other entry). However, those of ordinary skill in the art having the benefit of the present disclosure will recognize that the techniques described herein according to the present invention may be extended to operated on archive file entries recursively. In such an implementation, the level of possible granularity in terms of comparison of file contents would be significantly increased. If an entry in an archive file is itself an archive file, and if only a relatively small number of entries in such an "embedded" archive file are modified from version to version, then only those entries in the "embedded" archive file will need to be included and transmitted in the difference archive file.

In terms of a Java™ implementation, the present invention describes a technique which, given two JAR files (e.g., "org.jar" and "new.jar"), allows a file that describes the change between two JAR files (e.g., a "jardiff" file) to be computed. The jardiff file can then be applied to org.jar, and the result will be a file equivalent to new.jar.

In this context, the invention has the following properties. First, the algorithm works on the level of entries in a JAR file. For each changed entry (e.g., class) or new entry in new.jar (relative to org.jar) there will be an entry in the jardiff file. Second, the present invention provides a simple algorithm for computing and applying the jardiff file, which exhibits predictable and guaranteed performance. Third, the jardiff file is itself a JAR file. Thus, a jardiff file can be signed, using standard JAR signing tools. Finally, given a jardiff file between org.jar and new.jar, then the newprime.jar obtained by applying the jardiff file to org.jar is not necessarily binary identical to new.jar. However, each entry in the two jar files (i.e., new.jar and newprime.jar) is guaranteed to be identical.

Distributing updates using the "jardiff" format makes update requirements and packaging requirements orthogonal. For example, an application can be distributed as a single large JAR file. If a bug fix requires changes to a relatively small number of classes or other resources, they can be distributed in a single, relatively small, jardiff file. The structure of the jardiff file guarantees that the size of the jardiff file will only grow in proportional to the size of the changed or new entries in an archive file, instead of in proportion to the size of the entire archive file.

The jardiff format can be used for distributing updates over any media (i.e., network updates, CD-ROM disks, and the like). As mentioned earlier, updates can be performed either "in place," or new JAR files can be created based on old versions, keeping the original version intact.

In this context, the present invention provides a tailored diff format for JAR files. It differs from techniques currently known to those of ordinary skill in the art in at least the following respects. First, it uses knowledge about the underlying structure of archive files such as JAR files, in order to provide a simple generation algorithm which guarantees that only modified or new entries are transferred. Second, the jardiff format supports code signing. Third, a new file obtained by applying a jardiff file is not necessarily an exact binary copy of the actual target file. However, each entry in the JAR file is an exact binary copy.

The "jardiff" format describes how to apply incremental updates to a JAR file. For example, given two JAR files (e.g., org.jar and target.jar), a jardiff file can be computed (e.g., update-jardiff). The jardiff file (e.g., update-jardiff) can be applied to org.jar to yield targetprime.jar. If the two original JAR files have most entries in common, transmitting a jardiff file instead of the content of an entire JAR file can significantly reduce download time. The granularity of a jardiff file is on the order of each entry of a JAR file (i.e., a class file or other resource).

In the following discussion, it is assumed that original JAR file is named "from.jar," and the updated jar file is named "to.jar."

A jardiff file contains the following set of entries: First, it contains the set of entries that exists in to.jar but does not exist in from.jar, except for entries that have simply been renamed (i.e., the contents are identical but the file name or path has been changed). Next, it contains the set of entries that exists in from.jar, but that are modified in to.jar. Finally, it contains an index file, META-INF/jardiff, that describes the contents of the to.jar file, and how it relates to the from.jar file. It should be noted that a typical JAR file never contains a META-INF/jardiff file, so there will not be any conflict.

The index file describes how to transform the from.jar file into the to.jar file. in one embodiment, the file contains entries of the following form:

| Entry | Meaning |
| --- | --- |
| remove <entry> | Do not include the <entry> from from.jar in to.jar. |
| copy <from> <to> | Copy the entry <from> from from.jar into to.jar as <to>. |

In one embodiment, the following logical steps must be performed to apply a jardiff to an original JAR file. First, all entries in the jardiff file are added to the original JAR file, except for the META-INF/jardiff file. Existing entries are overwritten with the ones in the jardiff file, if there are name collisions. Next, the process iterates through the META-INF/jardiff file, applying the commands found. This requires renaming or deleting entries in the JAR file obtained from the first step.

The block diagrams and flowcharts described herein are illustrative of merely the broad architectures and logical flow of steps to achieve a method of the present invention and that steps may be added to, or taken away from, a flowchart without departing from the scope of the invention. Further, the order of execution of steps in the flowcharts may be changed without departing from the scope of the invention. Additional considerations in implementing the method described by a flowchart may dictate changes in the selection and order of steps.

In general, the flowcharts in this specification include one or more steps performed by software routines executing in a computer system. The routines may be implemented by any means known in the art. For example, any number of computer programming languages, such as the Java™ language, C, C++, Pascal, Smalltalk, FORTRAN, assembly language, etc., may be used. Further, various programming approaches such as procedural, object oriented or artificial intelligence techniques may be employed. It should be noted, however, that the platform-independent code should be written in a programming language especially suitable for platform-independent applications, such as the Java™ language or Smalltalk.

As known to those of ordinary skill in the art, the program code corresponding to implement aspects of the present invention may all be stored on a computer-readable medium. Depending on each particular implementation, computer-readable media suitable for this purpose may include, without limitation, floppy diskettes, hard drives, network drives, RAM, ROM, EEPROM, nonvolatile RAM, or flash memory.

While embodiments and applications of this invention have been shown and described, it would be apparent to those of ordinary skill in the art having the benefit of this disclosure that many more modifications than mentioned above are possible without departing from the inventive concepts herein. The invention, therefore, is not to be restricted except in the spirit of the appended claims.

What is claimed is:

1. A method for updating archive files, comprising:

creating an original archive file;

transmitting said original archive file to a client computer system;

creating a target archive file, wherein at least one entry in said target archive file has a file name that is identical to the file name of one of the entries in said original archive file, and wherein at least one entry in said target archive has file contents that are identical to the file contents of one of the entries in said original archive file;

generating a difference archive file as a function of said original archive file and said target archive file, wherein said difference archive file comprises and index file entry and a set of entries corresponding to each entry in said target archive file having file contents not identical to the file contents of any entry in the original archive file and not identical to the file contents of any other entry in the target archive file;

transmitting said difference archive file to said client computer system; and applying said difference archive file to said original archive file to generate a synthesized archive file, wherein said synthesized archive file comprises a set of entries, and wherein each of said entries in said synthesized archive file has an identical file name and identical file contents as the corresponding entry in said target archive file.

2. The method according to claim 1 wherein each of said original archive file, said target archive file, said difference archive file and said synthesized archive file comprises one or more JAR files.

3. The method according to claim 2, wherein said difference archive file is transmitted to said client computer system via a data communication network.

4. The method according to claim 3, wherein said data communication network is the network of networks commonly referred to as the Internet.

5. The method according to claim 2, wherein said difference archive file is transmitted to said client computer system via a CD-ROM disk.

6. The method according to claim 1, wherein said difference archive file is transmitted to said client computer system via a data communication network.

7. The method according to claim 6, wherein said data communication network is the network of networks commonly referred to as the Internet.

8. The method according to claim 1, wherein said difference archive file is transmitted to said client computer system via a CD-ROM disk.

9. A computerized system for updating archive files, comprising:

means for creating an original archive file;

means for transmitting said original archive file to a client computer system;

means for creating a target archive file, wherein at least one entry in said target archive file has a file name that is identical to the file name of one of the entries in said original archive file, and wherein at least one entry in said target archive has file contents that are identical to the file contents of one of the entries in said original archive file;

means for generating a difference archive file as a function of said original archive file and said target archive file, wherein said difference archive file comprises and index file entry and a set of entries corresponding to each entry in said target archive file having file contents not identical to the file contents of any entry in the original archive file and not identical to the file contents of any other entry in the target archive file;

means for transmitting said difference archive file to said client computer system; and means for applying said difference archive file to said original archive file to generate a synthesized archive file, wherein said synthesized archive file comprises a set of entries, and wherein each of said entries in said synthesized archive file has an identical file name and identical file contents as the corresponding entry in said target archive file.

10. The system according to claim 9 wherein each of said original archive file, said target archive file, said difference archive file and said synthesized archive file comprises one or more JAR files.

11. The system according to claim 10, wherein said difference archive file is transmitted to said client computer system via a data communication network.

12. The system according to claim 11, wherein said data communication network is the network of networks commonly referred to as the Internet.

13. The system according to claim 10, wherein said difference archive file is transmitted to said client computer system via a CD-ROM disk.

14. The system according to claim 9, wherein said difference archive file is transmitted to said client computer system via a data communication network.

15. The according to claim 14, wherein said data communication network is the network of networks commonly referred to as the Internet.

16. The system according to claim 9, wherein said difference archive file is transmitted to said client computer system via a CD-ROM disk.

17. A program storage device readable by a machine, tangibly embodying a program of instructions executable by the machine to perform a method for updating archive files, the method comprising:

creating an original archive file;

transmitting said original archive file to a client computer system;

creating a target archive file, wherein at least one entry in said target archive file has a file name that is identical to the file name of one of the entries in said original archive file, and wherein at least one entry in said target archive has file contents that are identical to the file contents of one of the entries in said original archive file;

generating a difference archive file as a function of said original archive file and said target archive file, wherein said difference archive file comprises and index file entry and a set of entries corresponding to each entry in said target archive file having file contents not identical to the file contents of any entry in the original archive file and not identical to the file contents of any other entry in the target archive file;

transmitting said difference archive file to said client computer system; and applying said difference archive file to said original archive file to generate synthesized archive file, wherein said synthesized archive file comprises a set of entries, and wherein each of said entries in said synthesized archive file has an identical file name and identical file contents as the corresponding entry in said target archive file.

* * * * *